US007415626B2

(12) United States Patent
Lilja et al.

(10) Patent No.: US 7,415,626 B2
(45) Date of Patent: Aug. 19, 2008

(54) METHODS, DEVICES AND CIRCUITS FOR ACTIVATING A COMMUNICATION DEVICE CONNECTED TO AN EXTERNAL BUS

(75) Inventors: Patrik Lilja, Raleigh, NC (US); Robert R. Horton, Apex, NC (US); Peter Cotterill, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 545 days.

(21) Appl. No.: 11/020,312

(22) Filed: Dec. 22, 2004

(65) Prior Publication Data

US 2006/0075271 A1    Apr. 6, 2006

Related U.S. Application Data

(60) Provisional application No. 60/615,563, filed on Oct. 1, 2004.

(51) Int. Cl.
*G06F 1/00*    (2006.01)
(52) U.S. Cl. .................. 713/500; 713/323; 713/322
(58) Field of Classification Search .............. 713/500, 713/323, 322
See application file for complete search history.

(56) References Cited

U.S. PATENT DOCUMENTS

| | | | |
|---|---|---|---|
| 5,995,820 | A | 11/1999 | Young et al. |
| 6,085,325 | A * | 7/2000 | Jackson et al. ............ 713/300 |
| 6,230,277 | B1 | 5/2001 | Nakaoka et al. |
| 6,467,042 | B1 * | 10/2002 | Wright et al. ............. 713/320 |
| 6,708,278 | B2 | 3/2004 | Howard et al. ............ 713/323 |
| 6,912,651 | B1 * | 6/2005 | Hamdi et al. .............. 713/1 |
| 7,089,434 | B2 * | 8/2006 | Kuo .......................... 713/300 |
| 2002/0040444 | A1 | 4/2002 | Ohie et al. |
| 2004/0128571 | A1 | 7/2004 | Saunders et al. |
| 2005/0219208 | A1 * | 10/2005 | Eichenberger et al. ...... 345/157 |

OTHER PUBLICATIONS

Compaq et al., "Universal Serial Bus Specification", Apr. 27, 2000, Revision 2.0, pp. 145.*
International Search Report and Written Opinion of the International Searching Authority for International Patent Application No. PCT/US2005/013294 mailed on Mar. 7, 2006.

* cited by examiner

*Primary Examiner*—Thomas Lee
*Assistant Examiner*—Ji H Bae
(74) *Attorney, Agent, or Firm*—Myers Bigel Sibley & Sajovec

(57) ABSTRACT

Methods for activating operations of a communication device coupled to an external communication bus include detecting a communication event on the external communication bus at a wake up circuit while a host controller coupled to the external communication bus is in an inactive state. An interrupt signal is provided to a processor of the communication device that is operating using a first clock signal running at a first clock rate from a first clock responsive to detection of the communication event by the wake up circuit. A clock enable signal is provided from the processor of the communication device, responsive to the interrupt signal, to a second clock in an inactive state. The second clock is coupled to a second circuit of the communication device separate from the processor of the communications device. Active state operations of the second clock are initiated to generate a second clock signal at a second clock rate greater than the first clock rate responsive to the clock enable signal. Operation of the host controller are initiated responsive to active state operations of the second clock.

31 Claims, 4 Drawing Sheets

METHODS, DEVICES AND CIRCUITS FOR ACTIVATING A COMMUNICATION DEVICE CONNECTED TO AN EXTERNAL BUS

CLAIM OF PRIORITY

This application claims priority to Provisional Application No. 60/615,563, filed on Oct. 1, 2004, the contents of which are incorporated herein by reference as if set forth in their entirety.

BACKGROUND OF THE INVENTION

The present invention relates to communication devices and, more particularly, to Universal Serial Bus (USB) communication device and methods of operating the same.

A variety of different types of devices communicate using the Universal Serial Bus (USB) standard. For USB bus based communications, one device, such as a personal computer, is generally the host device and supports a USB host controller. Attached devices operate as slave devices in communication with the host controller device. Various modes are known related to power control and the like apart from an operational mode. One such alternative mode is a suspend mode, where the host controller may request that the slave enter a suspend mode with limited current draw on the power line associated with the USB bus. Thus, various conditions arise where the host and slave communicate and the slave is expected to respond to a signal from the host controller.

Some slave devices include various additional functional circuitry unrelated to the USB communication circuitry. An example of a device that may use a USB connection to a host controller is a wireless communication device that is configured to operate as a wireless modem for the host controller device. A common cellular system design implementation for use in such a wireless modem is to generate the reference frequency for the radio in the RF section of the cellular device. The radio reference frequency is then commonly shared with the baseband circuit of the cellular device in order to generate the high frequency master clock for the microprocessor. During the intervals between the paging frames from the cellular network, all unnecessary circuits, including the RF section and much of the baseband circuit of the cellular device may be turned off in order to reduce power consumption. If the cellular device is to communicate with an application by means of a USB interface, the communication link may be disrupted and disabled during these deep sleep states due, for example, to the loss of the high frequency clocks from the cellular devices RF section.

One approach to avoid this condition may be to keep the RF powered on at all times to ensure that the clocks are available to support the USB interface, however, this would generally result in a significant power consumption penalty. Another approach may be to create a hardware (HW) handshake mechanism between the cellular device and the host controller application so that each can wake the other if a message is to be sent. However, this solution may not be compliant with the USB standard.

SUMMARY OF THE INVENTION

Some embodiments of the present invention provide methods for activating operations of a communication device coupled to an external communication bus. A communication event on the external communication bus is detected at a wake up circuit while a host controller coupled to the external communication bus is in an inactive state. An interrupt signal is provided to a processor of the communication device that is operating using a first clock signal running at a first clock rate from a first clock responsive to detection of the communication event by the wake up circuit. A clock enable signal is provided from the processor of the communication device, responsive to the interrupt signal, to a second clock in an inactive state, the second clock being coupled to a second circuit of the communication device separate from the processor of the communications device. Active state operations of the second clock are initiated to generate a second clock signal at a second clock rate greater than the first clock rate responsive to the clock enable signal and operations of the host controller are initiated responsive to active state operations of the second clock.

In some embodiments of the present invention, the communication device is a wireless communication device and the external bus is a Universal Serial Bus (USB). The second circuit is a radio frequency (RF) circuit of the wireless communication device and the second clock rate is a radio frequency. The wake up circuit is coupled to the USB D+ and/or D− line to detect the communication event. The processor of the communication device may be a baseband circuit of the wireless communication device and initiating operation of the host controller may include generating a high frequency master clock signal based on the second clock signal and having a clock rate greater than the first clock rate, providing the high frequency master clock signal to the baseband circuit, and initiating operations of the host controller responsive to provision of the high frequency master clock signal to the baseband circuit. Initiating active state operations of the second clock may include activating a radio frequency oscillator coupled to the RF circuit.

In other embodiments of the present invention, an interrupt inhibit signal may be provided to the wake up circuit that inhibits generation of the interrupt signal when the host controller is in an active state. The host controller, when in the inactive state, may appear to the external communication bus to be in a USB suspended state and the communication event may be a USB resume signal configured to wake the host controller from the USB suspended state. Detecting a communication event may include detecting a logic low on the D+ line and a logic high on the D− line.

In yet further embodiments of the present invention, operations further include detecting a reset signal on the external bus and initiating a reset of the communication device responsive to detecting a reset signal on the external bus. Detecting a reset signal may include detecting a logic low on the D+ line and a logic low on the D− line.

In other embodiments of the present invention, communications devices include a first circuit including a host controller coupled to an external communication bus. The first circuit has an active state in which it is configured to respond to communication events on the external communication bus and an inactive state in which it is not configured to respond to communication events on the external communication bus. The first circuit is also configured to generate a clock enable signal in the inactive state responsive to an interrupt signal. A first clock is coupled to the first circuit that is operative to generate a first clock signal at a first rate when the first circuit is in the inactive state. A second circuit of the communication device is coupled to the first circuit and has an active state and an inactive state. A second clock is coupled to the second circuit. The second clock is configured to generate a second clock signal at a second clock rate greater than the first clock rate to initiate activate state operations of the first circuit and the second circuit responsive to the clock enable signal. A wake up circuit of the communication devise is configured to generate the interrupt signal and provide the interrupt signal to the first circuit responsive to detection of a communication event on the external communication bus when the first circuit is in the inactive state.

In further embodiments of the present invention, the first circuit is a baseband circuit of the wireless communication device and the second circuit is configured to generate a high frequency master clock signal based on the second clock signal and having a third clock rate greater than the second clock rate and to provide the high frequency master clock signal to the baseband circuit. The baseband circuit is configured to initiate operations of the host controller responsive to provision of the high frequency master clock signal to the baseband circuit. The second clock may include a radio frequency oscillator coupled to the RF circuit that is activated responsive to the clock enable signal. The first circuit may be configured to provide an interrupt inhibit signal to the wake up circuit that inhibits generation of the interrupt signal when the host controller is in an active state.

In yet other embodiments of the present invention, the wake up circuit includes a NOR gate having inputs coupled to one of the D+ line and the D– line and to the interrupt inhibit signal. An AND gate has inputs coupled to an output of the NOR gate and another of the D+ line and the D– line that outputs the interrupt signal.

In yet further embodiments of the present invention, the communication devices further include a reset circuit configured to detect a reset signal on the external bus and to initiate a reset of the communication device responsive to detection of a reset signal on the external bus. The reset circuit may be configured to detect a logic low on the D+ line and a logic low on the D– line as the reset signal. The reset circuit may include a transistor 235 coupled between a reset line of the communication device and ground and a NOR gate having inputs coupled to the D+ line and the D– line and an output coupled to a gate of the transistor. The transistor may be an open drain transistor configured to draw sufficient current to ground the reset line if other sources of the communication device are operating to pull up the reset line. In some embodiments, an RC circuit is coupled between the transistor and the NOR gate of the reset circuit.

In other embodiments of the present invention, circuits are provided for activating operations of a communication device coupled to an external communication bus. The circuits include means for detecting a communication event on the external communication bus at a wake up circuit while a host controller coupled to the external communication bus is in an inactive state and means for providing an interrupt signal to a processor of the communication device that is operating using a first clock signal running at a first clock rate from a first clock responsive to detection of the communication event by the wake up circuit. The circuits further include means for providing a clock enable signal from the processor of the communication device, responsive to the interrupt signal, to a second clock in an inactive state, the second clock being coupled to a second circuit of the communication device separate from the processor of the communications device and means for initiating active state operations of the second clock to generate a second clock signal at a second clock rate greater than the first clock rate responsive to the clock enable signal. In addition; the circuits include means for initiating operation of the host controller responsive to active state operations of the second clock.

DETAILED DESCRIPTION

Figure 1:
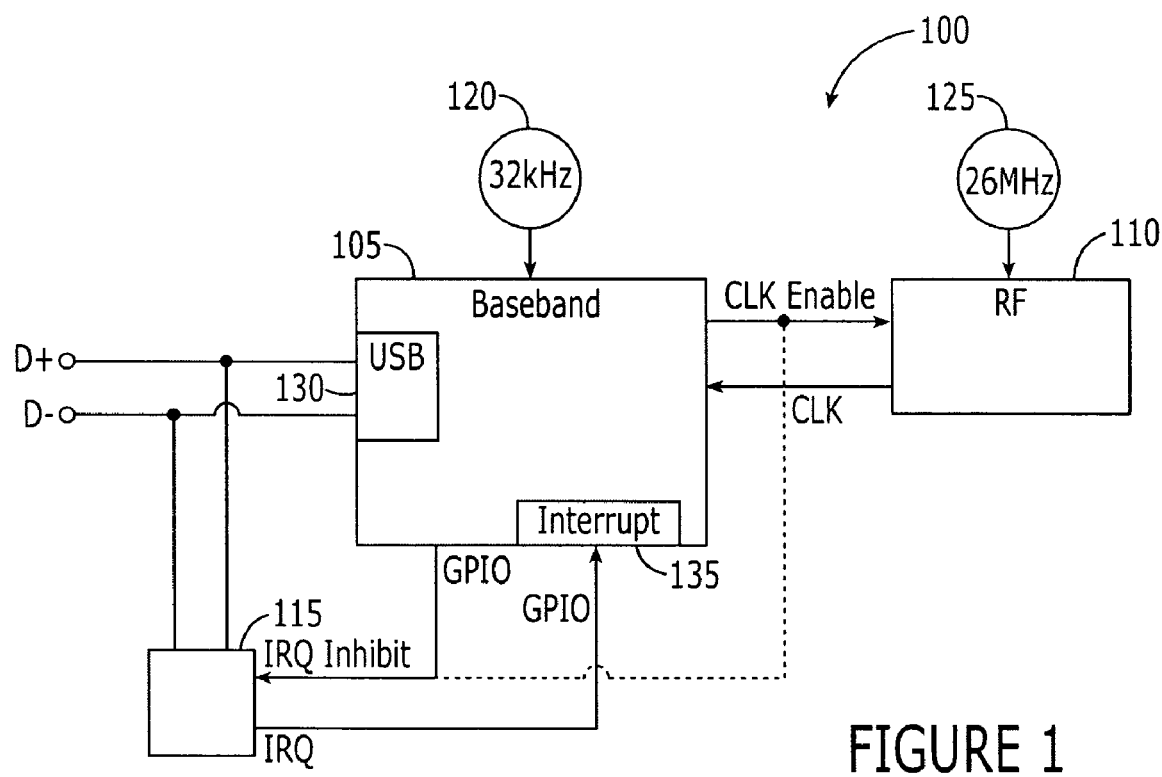
FIG. 1 is a block diagram illustrating a communication device according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items. Dotted lines denote optional aspects of embodiments of the present invention. As will be appreciated by one of skill in the art, the present invention may take the form of an entirely hardware embodiment, an entirely software embodiment or an embodiment combining software and hardware aspects all generally referred to herein as a "circuit" or "module."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, while a particular logic polarity is used herein to described the present invention, the opposite polarity may also be utilized for the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described below with reference to flowchart illustrations and/or block and/or flow diagrams according to embodiments of the invention. It will be understood that each block of the flowchart illustrations related to methods, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block and/or flow diagram block or blocks.

In accordance with some embodiments of the present invention, a wake up circuit senses the USB D+ (DP) and D− (DN) lines to detect the host initiated event for waking the cellular device from what the host believes to be a suspended state. When the circuit detects this event, the circuit may compare the "wake" state of the cellular device and generate an interrupt to the cellular device if the device is not already awake. This may allow the USB communications to resume and may be compliant to the USB standard for suspending of USB devices. As used herein, an "interrupt" signal generally refers to a logic signal indicating occurrence of an event, which logic signal may operate to interrupt execution of an executing program so that an alternative action can be taken or may be detected as part of the operations of an executing program without needing to interrupt execution.

Embodiments of the present invention will now be described below with respect to FIGS. 1 through 5. In the interests of facilitating understanding of the present invention, embodiments will be described herein with specific reference to a USB external bus and to a modem type communication device coupled thereto. While the illustrated modem device is configured to communicate over the USB external bus and a wireless communication link, it will be understood that the present invention is not limited to such devices and, in other embodiments, the communication device may only be configured to communicate over the external bus.

A USB supporting wireless modem device 100 according to some embodiments of the present invention is illustrated in FIG. 1. As shown in FIG. 1, the modem device 100 includes a first circuit, particularly illustrated as a baseband circuit 105, a second circuit, particularly illustrated as a radio frequency (RF) circuit 110 and a wake up circuit 115. The baseband circuit 105 and the RF circuit 110 may be, for example, separate application specific integrated circuit (ASIC) devices. The baseband circuit 105 and RF circuit 110 each have an active state and an inactive state, which may provide for reduced power consumption. In the active state, the baseband circuit 115 may be operative to respond to communication events on the external bus while, in the inactive state, the baseband circuit 105 (and, thus, the modem device 100) may not be operative to respond to such communication events.

The RF circuit 110 is coupled to a radio frequency (RF) clock, shown in the embodiments of FIG. 1 as including a 26 megahertz (MHz) clock/crystal oscillator 125, operative to generate a clock signal at a selected rate (frequency). The baseband circuit 105 is coupled to a separate clock, shown in the embodiments of FIG. 1 as including the 32 kilohertz (kHz) clock/crystal/oscillator 120, operative to generate a clock signal at a different rate (frequency). It will be understood that a crystal or oscillator component of a clock may be external to the respective baseband circuit 105 and RF circuit 110 with additional conditioning circuitry utilized in generating clock signals from the clocks 120, 125 being included in the corresponding baseband circuit 105 and/or RF circuit 110 in some embodiments of the present invention while, in other embodiments, a conditioned clock signal may be provided from the clocks 120, 125 to the respective circuits 105, 110.

The 26 MHz clock 125 may be shut down during deep sleep mode and operations are then based on the 32 kHz clock 120. The RF circuit 110 provides a high frequency master clock signal (Clk) to the baseband circuit 105, based on a clock signal from the second clock 125. The high frequency master clock signal may be stepped up by the baseband circuit 105 to, for example, 104 MHz, for operations during an awake state.

In the illustrated embodiments of FIG. 1, the baseband circuit 105 is also configured to generate a clock enable signal (CLK Enable) to the RF circuit 110 to wake up the 26 MHz clock 125 responsive to an interrupt received by an interrupt circuit 135 included in the baseband circuit 105. The baseband circuit 105 also includes a host controller, shown as a USB control circuit 130 supporting USB bus communications, in the embodiments of FIG. 1. The circuit 130 of the embodiments of FIG. 1, while referred to herein as a "host controller," may operate as a USB slave device as will be described herein. Thus, it will be understood that, as used herein, a "host controller" generally refers to an external bus control circuit that need not be a master device with respect to communications occurring on the external bus.

The wake up circuit 115 monitors the USB signal lines D+ and D− of the USB external communication bus and generates an interrupt signal (IRQ) to wake the modem device 100 from a deep sleep mode. It may also receive an interrupt inhibit signal (IRQ Inhibit) to inhibit generation of a wake up interrupt IRQ when the modem device 100 is in the awake state. The IRQ and IRQ Inhibit signals are shown as connected to general purpose input/output (GPIO) ports of the baseband circuit 105. As shown in dotted line in FIG. 1, the IRQ Inhibit signal may alternatively be coupled to the CLK Enable signal, such that when the CLK Enable signal is active the IRQ generation may be inhibited. Furthermore, while not shown in FIG. 1, the presence of an output from the 26 MHz clock 125 may be sensed to generate the IRQ Inhibit signal. The IRQ signal initiates power up of the 26 MHz clock 125 to transition the modem device 100 from the deep sleep (inactive) state to an awake (active) state configured to respond to communication events on the USB external communication bus.

Figure 2:
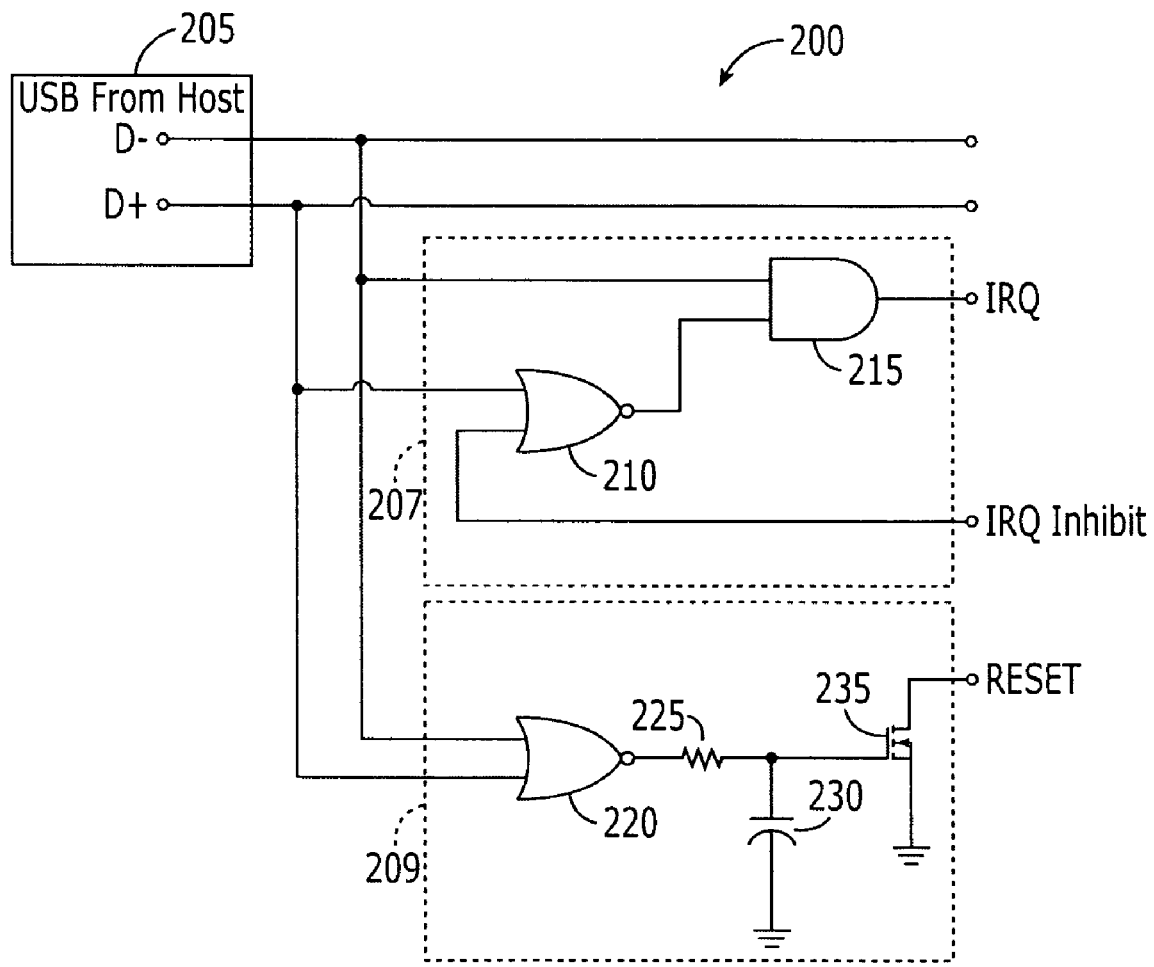
FIG. 2 is a circuit diagram illustrating a logic circuit including a wake up circuit according to some embodiments of the present invention.

FIG. 2 illustrates some embodiments of a logic circuit 200 suitable for use as the wake up circuit 115 of FIG. 1. As shown for the embodiments of FIG. 2, the logic circuit 200 includes both a wake up circuit 207 and a reset circuit 209 coupled to the D+ and D− signals from the USB interface 205. The wake up circuit 207 includes a NOR gate 210 and an AND gate 215. The NOR gate 210 has inputs coupled to the D+ line and the IRQ Inhibit line. The AND gate 215 has inputs coupled to the output of the NOR gate 210 and to the D− line. The output of the AND gate 215 is the wake up interrupt signal IRQ. Thus, the wake up circuit 207 is configured to generate a wake up interrupt signal (here a low to high transition of IRQ) responsive to a logic low on D+ and a logic high on D− when IRQ Inhibit is a logic low indicating the device 100 is in a deep sleep state. In alternative embodiments of the present invention, the connections of the D+ and D− line can be swapped or other arrangements may be provided for different signal conditions on the external bus to trigger a wake up interrupt signal. For example, for an IEEE-1394 external bus, different state conditions on the lines may trigger an interrupt signal from the wake up circuit 207.

In accordance with the USB standards, the described logic detects a resume signal requesting the modem device 100 to wake up from a USB "suspend" state (distinct from the "deep sleep" state of the modem device 100) for a fill speed USB device. Such a command may be sent to a modem device 100 in an inactive or "deep sleep" state as the modem device 100, in such a condition, may appear to the external communication bus to be in a USB suspended state. It will be understood that this logic may be modified for the signal state conditions appropriate for a low speed device or a high speed device depending upon the type of device in which the present invention is utilized. The logic of the wake up circuit 207 for some embodiments of the present invention as shown in FIG. 2 is detailed in Table 1 below.

TABLE 1

| IRQ Inhibit | D− | D+ | IRQ |
|---|---|---|---|
| 0 | 0 | 0 | 0 |
| 0 | 0 | 1 | 0 |
| 0 | 1 | 0 | 1 |
| 0 | 1 | 1 | 0 |
| 1 | 0 | 0 | 0 |
| 1 | 0 | 1 | 0 |
| 1 | 1 | 0 | 0 |
| 1 | 1 | 1 | 0 |

The reset circuit 209 is configured to detect a reset signal on the external bus and to initiate a reset of the modem device 100 responsive to detection of the reset signal on the external bus. In the illustrated embodiments of FIG. 2, the reset circuit 209 includes a NOR gate 220, a resistor 225, a capacitor 230 and a transistor 235, in particular for the illustrated embodiments, an open drain NMOS transistor configured to draw sufficient current to ground the RESET line even if other sources are attempting to pull up the RESET line to a high voltage. Thus, the reset circuit 209 is configured to allow a host controller to initiate a hardware reset of the modem device 100 by applying logic low signals to D+ and D− concurrently. The logic of the reset circuit 209 of the embodiments of FIG. 2 is detailed in TABLE 2 below.

TABLE 2

| D− | D+ | RESET |
|---|---|---|
| 0 | 0 | 0 |
| 0 | 1 | 1 |
| 1 | 0 | 1 |
| 1 | 1 | 1 |

Figure 3:
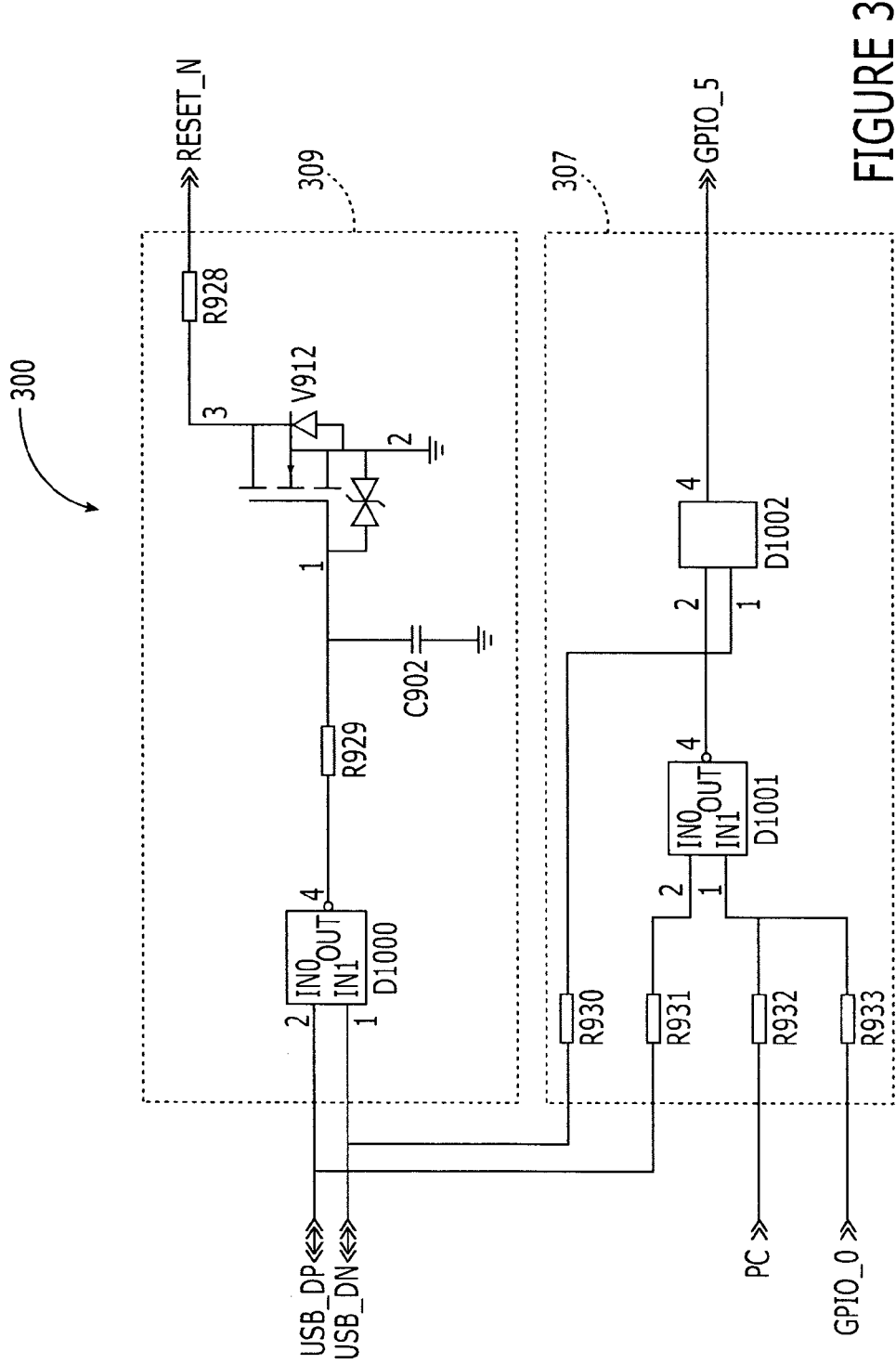
FIG. 3 is a circuit diagram illustrating a logic circuit including a wake up circuit according to some embodiments of the present invention.

Further embodiments of the present invention are illustrated in FIG. 3.

FIG. 3 illustrates a logic circuit 300 including a wake up circuit 307 and a reset circuit 309 operating according to substantially the same logic as described above with reference to FIG. 2. The illustration of FIG. 3 differs from FIG. 2 in the circuit illustration conventions used. The reset circuit 309 of FIG. 3 also includes a diode V912 and a DIAC coupled to an open drain NMOS transistor and a resistor R928. The wake up circuit 307 of FIG. 3, as compared to the wake up circuit 207 of FIG. 2, includes resistors R930, R931, R932 and R933.

Figure 4:
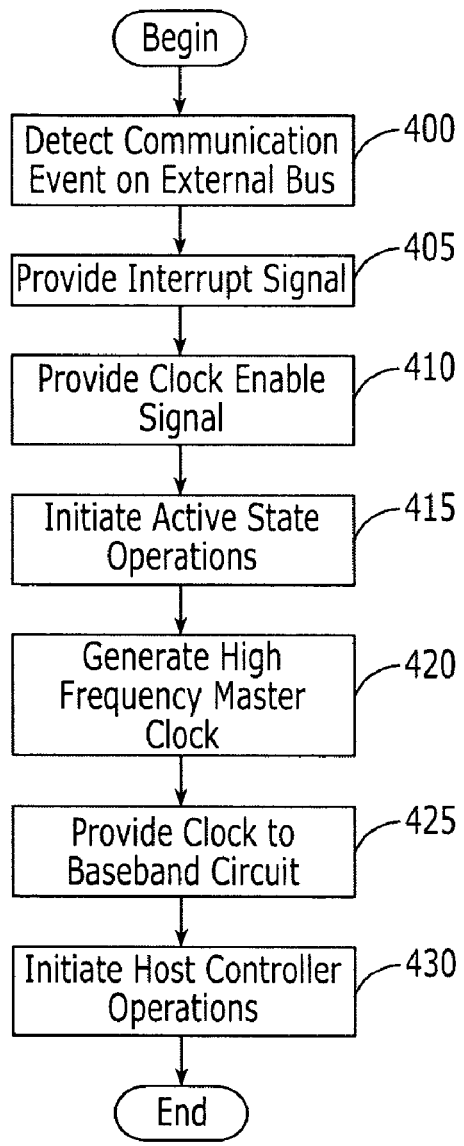
FIG. 4 is a flowchart illustrating operations of a communication device according to some embodiments of the present invention.

Methods for activating operations of a communication device coupled to an external communication bus according to various embodiments of the present invention will now be described with reference to the flow chart illustration of FIG. 4. As shown in the embodiments of FIG. 4, operations begin at Block 400 by detecting a communication event on an external communication bus at a wake up circuit while a host controller coupled to the external communication bus is in an inactive state. An interrupt signal is provided to a processor of the communication device that is operating using a first clock signal running at a first clock rate from a first clock responsive to detection of the communication event by the wake up circuit (Block 405). A clock enable signal is provided from the processor of the communication device to a second clock in an inactive state (Block 410). The second clock is coupled to a second circuit of the communication device separate from the processor of the communication device. Active state operations of the second clock are initiated to generate a second clock signal at a second clock rate greater than the first clock rate responsive to the clock enable signal (Block 415). Operations at Block 415, in some embodiments of the present invention, include activating a radio frequency oscillator coupled to the RF (second) circuit.

Operations related to initiating operation of the host controller responsive to active state operations of the second clock will now be described for various embodiments of the present invention with reference to Blocks 420-430. For the illustrated embodiments of FIG. 4, the processor of the communication device is a baseband circuit of a wireless communication device. A high frequency master clock signal is generated based on the second clock signal and having the third clock rate greater than the second clock rate (Block 420). The high frequency master clock signal is provided to the baseband circuit (Block 425). Operations of the host controller are initiated responsive to provision of the high frequency master clock signal to the baseband circuit (Block 430). Note that, in some embodiments of the present invention, an interrupt enable signal may be provided to the wake up circuit that inhibits generation of the interrupt signal once the host controller is in the active state at Block 430.

Figure 5:
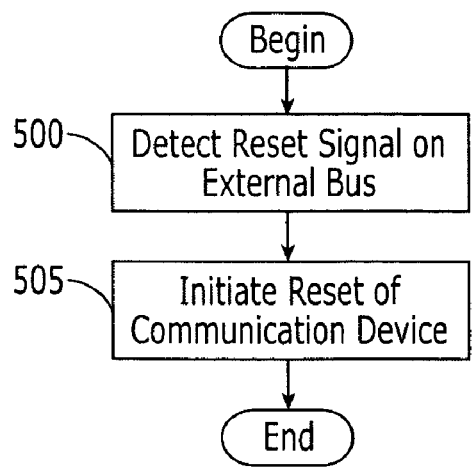
FIG. 5 is a flowchart illustrating reset operations of a communication device according to further embodiments of the present invention.

Further operations related to controlling a communication device coupled to an external bus according to various embodiments of the present invention will now be described with reference to the flowchart diagram of FIG. 5. As shown in FIG. 5, operations begin by detecting a reset signal on the external bus. For example, a reset signal may be detected, in various USB external bus embodiments, by detecting a logic low on both the D+ line and the D− line of the USB external communication bus. A reset of the communication device is initiated responsive to detecting a reset signal on the external signal of the bus (Block 505).

The flowcharts, flow diagrams and block diagrams of FIGS. 1, 4 and 5 illustrate the architecture, functionality, and operation of possible implementations of methods for tuning micro-speaker assemblies. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may be executed in the reverse order, depending upon the functionality involved.

Many alterations and modifications may be made by those having ordinary skill in the art, given the benefit of present disclosure, without departing from the spirit and scope of the invention. For example, any circuit configured to provide the logic of Tables 1 and/or 2 may be utilized. Therefore, it must That which is claimed is:

1. A method for activating operations of a communication device coupled to an external communication bus, comprising:
   detecting a communication event on the external communication bus at a wake up circuit while a host controller coupled to the external communication bus is in an inactive state;
   providing an interrupt signal to a processor of the communication device that is operating using a first clock signal running at a first clock rate from a first clock responsive to detection of the communication event by the wake up circuit;
   providing a clock enable signal from the processor of the communication device, responsive to the interrupt signal, to a second clock in an inactive state, the second clock being coupled to a second circuit of the communication device separate from the processor of the communication device;
   initiating active state operations of the second clock to generate a second clock signal at a second clock rate greater than the first clock rate responsive to the clock enable signal; and
   initiating operation of the host controller responsive to active state operations of the second clock.

2. The method of claim 1, wherein the communication device comprises a wireless communication device and wherein the external bus comprises a Universal Serial Bus (USB) having a D+ and/or D− line and wherein the second circuit comprises a radio frequency (RF) circuit of the wireless communication device and wherein the second clock rate comprises a radio frequency and wherein the wake up circuit is coupled to the USB D+ and/or D− line to detect the communication event.

3. The method of claim 2 wherein the processor of the communication device comprises a baseband circuit of the wireless communication device and wherein initiating operation of the host controller includes:
   generating a high frequency master clock signal based on the second clock signal and having a clock rate greater than the first clock rate;
   providing the high fiequency master clock signal to the baseband circuit; and
   initiating operations of the host controller responsive to provision of the high frequency master clock signal to the baseband circuit.

4. The method of claim 3 wherein initiating active state operations of the second clock includes activating a radio frequency oscillator coupled to the RF circuit.

5. The method of claim 2 further comprising providing an interrupt inhibit signal to the wake up circuit that inhibits generation of the interrupt signal when the host controller is in an active state.

6. The method of claim 2, wherein the host controller, when in the inactive state, appears to the external communication bus to be in a USB suspended state and wherein the communication event comprises a USB resume signal configured to wake the host controller from the USB suspended state.

7. The method of claim 6 wherein the Universal Serial Bus (USB) has the D+ and the D− line and wherein detecting a communication event comprises detecting a logic low on the D+ line and a logic high on the D− line.

8. The method of claim 6 further comprising:
   detecting a reset signal on the external bus; and
   initiating a reset of the communication device responsive to detecting a reset signal on the external bus.

9. The method of claim 8 wherein the Universal Serial Bus (USB) has the D+ and the D− line and wherein detecting a reset signal comprises detecting a logic low on the D+ line and a logic low on the D− line.

10. The method of claim 1 further comprising:
    detecting a reset signal on the external bus; and
    initiating a reset of the communication device responsive to detecting a reset signal on the external bus.

11. A communication device comprising:
    a first circuit including a host controller coupled to an external communication bus, the first circuit having an active state in which it is configured to respond to communication events on the external communication bus and an inactive state in which it is not configured to respond to communication events on the external communication bus, the first circuit being configured to generate a clock enable signal in the inactive state responsive to an interrupt signal;
    a first clock coupled to the first circuit that is operative to generate a first clock signal at a first rate when the first circuit is in the inactive state;
    a second circuit of the communication device coupled to the first circuit and having an active state and an inactive state;
    a second clock coupled to the second circuit, the second clock being configured to generate a second clock signal at a second clock rate greater than the first clock rate to initiate activate state operations of the first circuit and the second circuit responsive to the clock enable signal; and
    a wake up circuit configured to generate the interrupt signal and provide the interrupt signal to the first circuit responsive to detection of a communication event on the external communication bus when the first circuit is in the inactive state.

12. The device of claim 11, wherein the communication device comprises a wireless communication device and wherein the external bus comprises a Universal Serial Bus (USB) having a D+ and/or D− line and wherein the second circuit comprises a radio frequency (RF) circuit of the wireless conmmnication device and wherein the second clock rate comprises a radio frequency and wherein the wake up circuit is coupled to the USB D+ and/or D− line to detect the communication event.

13. The device of claim 12 wherein the first circuit comprises a baseband circuit of the wireless communication device and wherein the second circuit is configured to generate a high frequency master clock signal based on the second clock signal and having a third clock rate greater than the second clock rate and to provide the high frequency master clock signal to the baseband circuit and wherein the baseband circuit is configured to initiate operations of the host controller responsive to provision of the high frequency master clock signal to the baseband circuit.

14. The device of claim 13 wherein the second clock includes a radio frequency oscillator coupled to the RF circuit that is activated responsive to the clock enable signal.

15. The device of claim 12 wherein the first circuit is configured to provide an interrupt inhibit signal to the wake up circuit that inhibits generation of the interrupt signal when the host controller is in an active state.

16. The device of claim 15, wherein the host controller, when in the inactive state, appears to the external communication bus to be in a USB suspended state and wherein the communication event comprises a USB resume signal configured to wake the host controller from the USB suspended state.

17. The device of claim 16 wherein the Universal Serial Bus (USB) has the D+ and the D− line and wherein the wake up circuit is configured to detect a logic low on the D+ line and a logic high on the D− line.

18. The device of claim 17 wherein the Universal Serial Bus (USB) has the D+ and the D− line and wherein the wake up circuit comprises:
 a NOR gate having inputs coupled to one of the D+ line and the D− line and to the interrupt inhibit signal; and
 an AND gate having inputs coupled to an output of the NOR gate and another of the D+ line and the D− line that outputs the interrupt signal.

19. The device of claim 16 further comprising a reset circuit configured to detect a reset signal on the external bus and to initiate a reset of the communication device responsive to detection of a reset signal on the external bus.

20. The device of claim 19 wherein the Universal Serial Bus (USB) has the D+ and the D− line and wherein the reset circuit is configured to detect a logic low on the D+ line and a logic low on the D− line as the reset signal.

21. The device of claim 20 wherein the reset circuit comprises: a transistor coupled between a reset line of the communication device and ground; and
 a NOR gate having inputs coupled to the D+ line and the D− line and an output
 coupled to a gate of the transistor.

22. The device of claim 21 wherein the transistor comprises an open drain transistor configured to draw sufficient current to ground the reset line if other sources of the communication device are operating to pull up the reset line.

23. The device of claim 22 further comprising an RC circuit coupled between the transistor and the NOR gate of the reset circuit.

24. The device of claim 22 wherein the wake up circuit comprises:
 a NOR gate having inputs coupled to one of the D+ line and the D− line and to the interrupt inhibit signal; and
 an AND gate having inputs coupled to an output of the NOR gate and another of the D+ line and the D− line that outputs the interrupt signal.

25. The device of claim 11 further comprising a reset circuit configured to detect a reset signal on the external bus and to initiate a reset of the communication device responsive to detection of a reset signal on the external bus.

26. The device of claim 11, wherein the host controller, when in the inactive state, appears to the external communication bus to be in a USB suspended state and wherein the communication event comprises a USB resume signal configured to wake the host controller from the USB suspended state.

27. A circuit for activating operations of a communication device coupled to an external communication bus, the circuit comprising:
 means for detecting a communication event on the external communication bus at a wake up circuit while a host controller coupled to the external communication bus is in an inactive state;
 means for providing an interrupt signal to a processor of the communication device that is operating using a first clock signal running at a first clock rate from a first clock responsive to detection of the communication event by the wake up circuit;
 means for providing a clock enable signal from the processor of the communication device, responsive to the interrupt signal, to a second clock in an inactive state, the second clock being coupled to a second circuit of the communication device separate from the processor of the communication device;
 means for initiating active state operations of the second clock to generate a second clock signal at a second clock rate greater than the first clock rate responsive to the clock enable signal; and
 means for initiating operation of the host controller responsive to active state operations of the second clock.

28. The circuit of claim 27, wherein the communication device comprises a wireless communication device and wherein the external bus comprises a Universal Serial Bus (USB) having a D+ and/or D− line and wherein the second circuit comprises a radio frequency (RF) circuit of the wireless communication device and wherein the second clock rate comprises a radio frequency and wherein the wake up circuit is coupled to the USB D+ and/or D− line to detect the communication event.

29. The circuit of claim 28 wherein the processor of the communication device comprises a baseband circuit of the wireless communication device and wherein the means for initiating operation of the host controller includes:
 means for generating a high frequency master clock signal based on the second clock signal and having a clock rate greater than the first clock rate;
 means for providing the high frequency master clock signal to the baseband circuit; and
 means for initiating operations of the host controller responsive to provision of the high frequency master clock signal to the baseband circuit.

30. The circuit of claim 27 further comprising means for detecting a reset signal on the external bus and for initiating a reset of the communication device responsive to detection of a reset signal on the external bus.

31. The circuit of claim 27, wherein the host controller, when in the inactive state, appears to the external communication bus to be in a USB suspended state and wherein the communication event comprises a USB resume signal configured to wake the host controller from the USB suspended state.

* * * * *